UNITED STATES PATENT OFFICE.

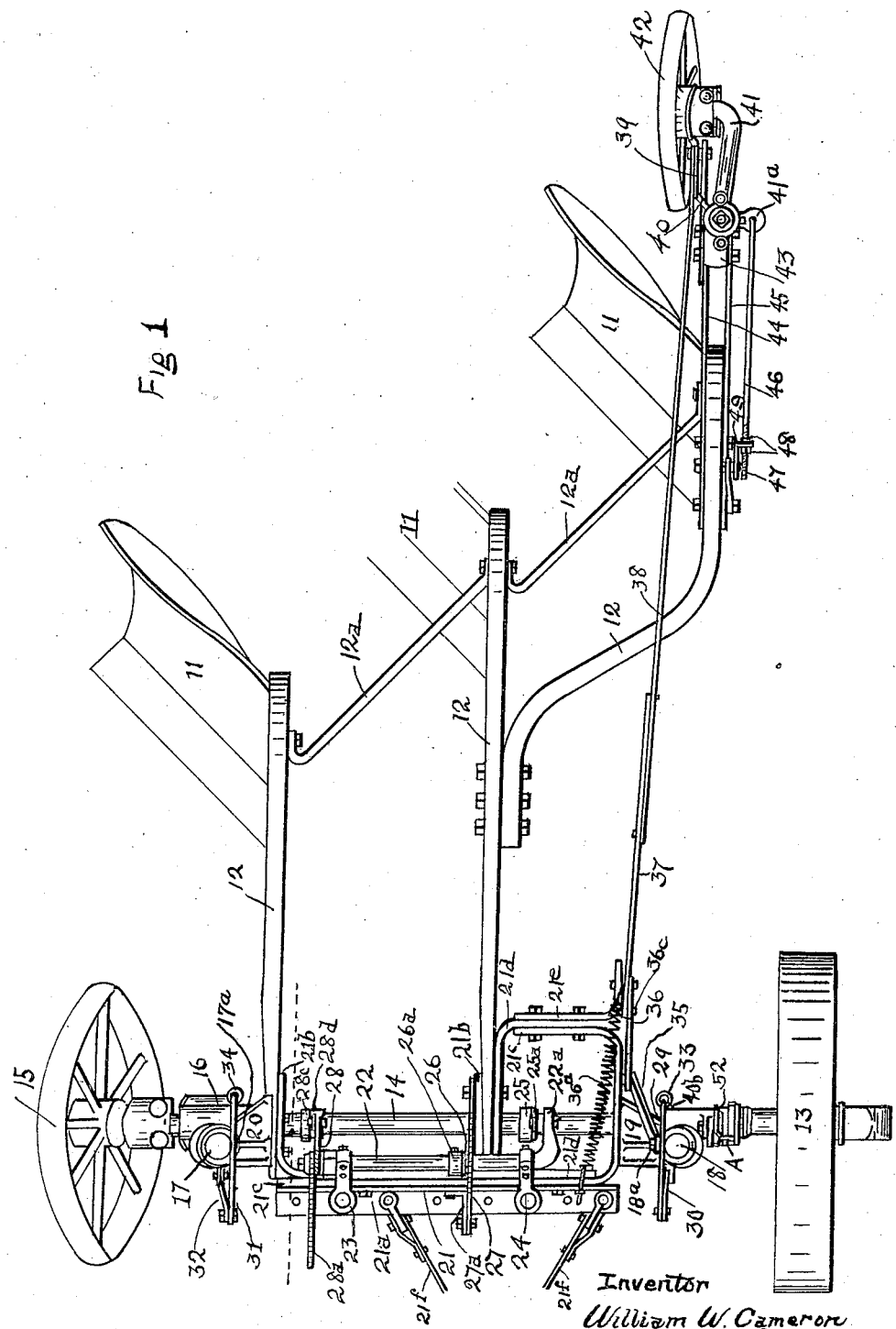

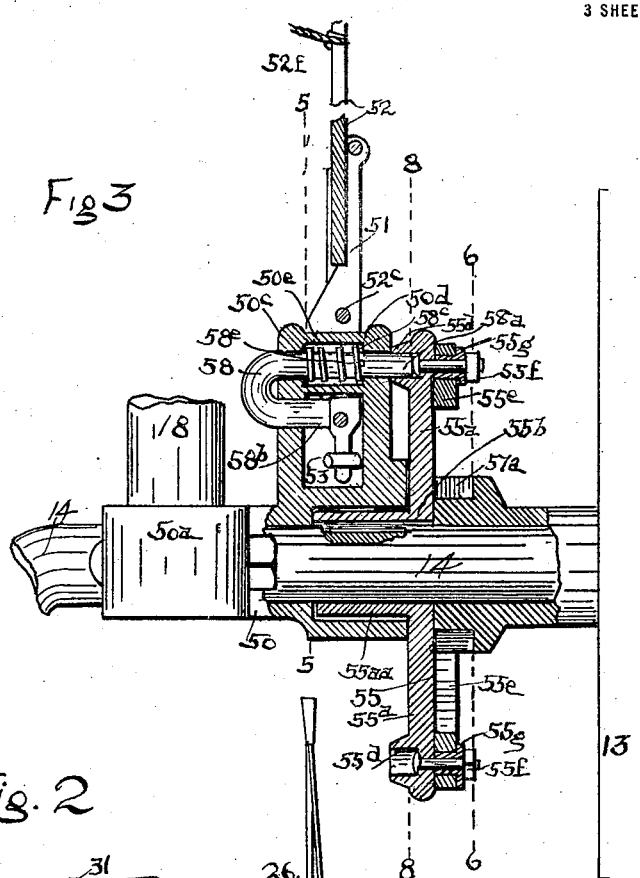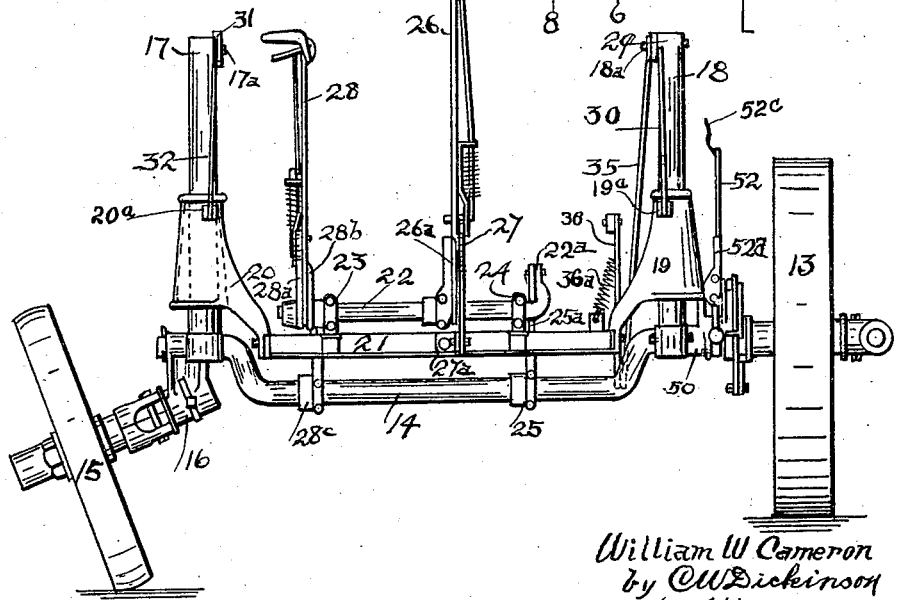

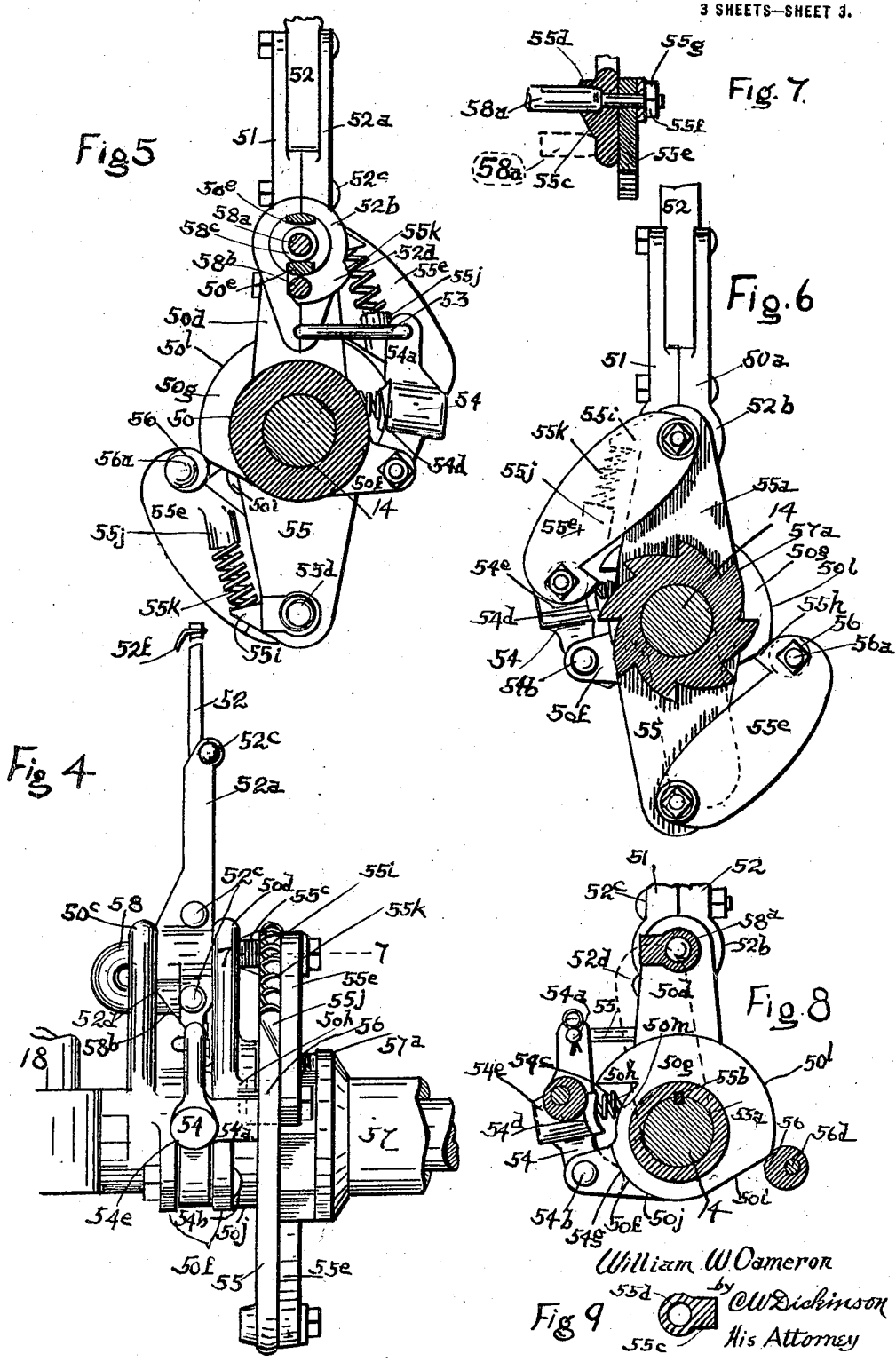

WILLIAM W. CAMERON, OF LA CROSSE, WISCONSIN, ASSIGNOR, BY MESNE ASSIGNMENTS, TO FRED GERLACH AND ARNOLD B. KELLER, TRUSTEES, OF CHICAGO, ILLINOIS.

PLOW.

1,415,311.  Specification of Letters Patent.  Patented May 9, 1922.

Original application filed February 27, 1917, Serial No. 151,347. Divided and this application filed August 1, 1919. Serial No. 314,664.

*To all whom it may concern:*

Be it known that I, WILLIAM W. CAMERON, a citizen of the United States of America, residing at 1008 Rose Street, in the city of La Crosse, county of La Crosse, State of Wisconsin, have invented new and useful Improvements in Plows, of which the following is a true specification, reference being had to the accompanying drawings.

The invention relates to plows, and more especially to that type of plows having carrying wheels, and that are raised and lowered from and to the ground by power operated means, usually derived from one of the wheels that sustain the plows upon the ground, and that are provided with means for locking the plows in their raised and in their lowered position.

The object of the invention is to provide mechanism for raising and lowering the plows, and whereby the release of such shifting means at the proper point shall be easily accomplished without strain or undue friction upon the parts, and, while operating automatically, shall be under the due control of the operator, who may be a driver upon a tractor engine used for pulling the plow for plowing purposes.

In the raising and lowering of plows provided with power operated mechanism, the shifting mechanism usually consists of some form of clutch having parts that slidingly enter into and out of cooperative engagement, and the usual practice has been to release these parts substantially at a point when other parts come into play to lock the plows in their extreme positions, and the movement to shift and release the mechanism has come while the strain of shifting is still in progress, the resistance of the plow giving the greatest amount of friction and resistance upon the cooperating parts of the clutch, making it exceedingly difficult to accomplish the release of the parts, and to throw the locking mechanism into effect. The release and the locking of the plow are usually substantially coincidental results, accomplished just as the plow has reached its highest or its lowest position, and the parts are in a dead center relation.

In my improved device, however, I have timed the releasing mechanism so that it will automatically become effective just after the shifting parts have passed the true dead center relation, and at a point somewhat separated from the position of the locking mechanism, so that the movement of the parts, aided somewhat by the power of gravity will carry the driven member of the clutch a little faster than the driving member, and render the separation of the parts very easy, without strain and severe friction. The movement of the parts will automatically carry them into position where the locking mechanism will automatically become effective, without positive power exerted by the driving member of the clutch. When locked, the parts will be in approximate, but not in actual, dead center relation, and are automatically controlled in that position, so that any strain exerted by passing over obstructions, or into ruts, and the like, will still make the thrust substantially across the dead center without being on the precise dead center line.

In the drawings, Fig. 1 is a plan of a structure embodying my invention; Fig. 2 is a front elevation; Fig. 3 is a vertical detail of the clutch mechanism having sectioned parts taken on the axis of the shifting crank adjacent the power wheel; Fig. 4 is another view of the same parts as are shown in Fig. 3, but in full lines; Fig. 5 is a detail of the lifting parts, partly in section, taken on line 5—5 of Fig. 3; Fig. 6 is a detail, partly in section, of the ratchet wheel and dogs of the shifting mechanism, taken on line 6—6 of Fig. 3; Fig. 7 is a detail of the locking mechanism, taken on the horizontal line 7—7 of Fig. 4; Fig. 8 is a detail, partly in section, taken on line 8—8 of Fig. 3; Fig. 9 is a detail of a piece used in the locking mechanism.

In the drawings, the numeral 11 indicates the plow bottoms attached to plow beams 12, which are securely braced together at the rear by braces 12ª, and at the front by the U-brace 21ᵇ, to form a rigid plow carrying structure. 13 is a carrying wheel travelling upon the unplowed ground, and mounted upon the landside end of a crank shaft 14; 15 is the front furrow wheel, mounted upon a sloping stub-axle carried in the bracket 16, loosely mounted upon the plowed-ground end of the crank shaft 14; 17 is a vertical standard rigidly secured to the bracket 16; 18 is a similar standard mounted upon the bracket 50, through which passes the landside end of the crank shaft 14; 19 and 20 are brackets having internal transversely tapered openings permitting lateral oscillation of the standards therein, and which slide vertically upon the standards 17 and 18.

Forming a part of the plow carrying structure is a laterally projecting bracket reaching toward the landside at the forward end of the middle beam, comprising the bar $21^c$ securely bolted to the face of the U-brace $21^b$, and extending inwardly and bent backwardly, as shown in Fig. 1. Bolted to the forward end of this beam at the outside thereof is a U-shaped bracket $21^d$, suitably conjoined to the part $21^c$; to the rear of the rear leg of the part $21^d$ is bolted an elbow member $21^e$. These parts are rigidly secured to each other. To the forward face of the member $21^e$ is secured a horizontal clevis $21^a$, from which forwardly project draft bars $21^f$, for suitable connection with a tractor engine or other draft means. The bracket 19 is secured to the outer bar $21^c$ and the bracket 20 to the beam 12.

22 is a short crank pivotally mounted upon the brackets 23 and 24 rigidly attached to the frame 21, and having a crank arm $22^a$ upon one end, as shown in Figs. 1 and 2. A connecting strap 25 and $25^a$ is, at its upper end pivotally connected to the free end of the arm $22^a$, and at its lower end is pivotally mounted on the crank shaft 14. Centrally of the shaft 22 is rigidly attached a lever 26 by means of the lever socket $26^a$. Rigidly attached to the forward end of the plow carrying structure is a ratchet 27, concentric with the axis of the shaft 22, whereby the lever is locked in various adjusted positions, and with it the shaft 22.

Upon the opposite end of the shaft 22 is pivotally connected the bent lever 28, its forward end being pivotally connected to the upper end of the connecting strap $28^c$, the lower end of which is also pivotally mounted upon the crank shaft 14. At the outer end of the shaft 22 is rigidly secured a ratchet $28^a$, whereby the lever 28 is locked in various relations to the shaft 22. By means of the lever 28 and its connections with the plow carrying structure, the latter may be tilted transversely with regard to the crank shaft 14, which, with the brackets 16 and 50 and the wheels 13 and 15, constitute a supporting structure, and the level of the plow carrying structure thereby changed. By means of the lever 26 the whole plow carrying structure may be shifted vertically bodily with relation to the supporting structure, as the connections $25-25^a$ and $28^c$ are supported upon the crank shaft 14, and when the shaft 22 is rotated by the lever 26, the shaft 22 and with it the front end of the plow carrying structure will be shifted accordingly.

On the pivots $17^a$ and $18^a$ at the tops of the standards 17 and 18 respectively are pivotally mounted oscillating bars 29 and 31. At the front ends of these bars are connecting straps 30 and 32, the lower ends of which are pivotally connected, by means of ears $19^a$ and $20^a$ to the brackets 19 and 20 respectively. At the rear ends of the oscillating bars 29 and 31 are attached lifting springs 33 and 34, the lower ends of which are secured to lugs on the rear of the brackets 16 and 50. The springs materially assist in raising the plow carrying structure and easing its descent and in carrying the parts to a locking position.

Pivotally mounted on the pivot $18^a$ is the upper end of a connecting strap 35, the lower end of which is pivotally connected to the lower end of a bell crank 36, which in turn is pivoted on the rear end of an extension bar $21^e$ of the plow carrying structure. The upper arm of the bell crank is pivoted, at $36^c$, to the forward end of a connecting bar 37—38, the rear end of which is pivotally connected to the free end of a bell crank 39, that is freely supported by a strap 40 from the free or upright end portion of a crank axle 41, having a carrying wheel 42, the upright end of the axle laterally swivelling in an upright sleeve forming a part of a bracket 43 that is rigidly secured to the outer plow beam by means of straps 44 and 45. The upper end of the axle 41 has secured thereto an arm $41^a$, to which is pivotally secured the rear end of a rod 46 that at its forward end passes through a bracket 49 rigidly secured to the plow carrying structure, the forward end of the rod having a threaded portion 47, and adjusting nuts 48 one on each side of the bracket. By adjusting these nuts in either direction the direction of travel of the wheel 42 may be changed slightly, to make the rear of the plows hug more or less to the land, as the necessities of plowing may require. The rear wheel and its controlling means are not a part of the present invention, but the mechanism is more particularly described in a pending application of this applicant, Serial Number 151,347, filed Feb. 27, 1917, of which this application is a division.

My improved means for vertically shifting and controlling the plow carrying structure by mechanical means is described as follows:

Rigidly attached to the inner end of the hub 57 of the wheel 13 is a ratchet wheel $57^a$, which may be made integral with the hub, and which constantly rotates about the outer portion of the crank shaft 14 as the wheel rotates. Rigidly secured to the crank shaft 14 by the key $55^b$, adjacent to the ratchet wheel $57^a$, is a member 55, having a sleeve $55^{aa}$ and opposed arms $55^a$; at the outer extremities of the respective arms, and facing toward ears 50ᶜ and 50ᵈ, on the bracket 50, are laterally projecting lugs having cam surfaces 55ᶜ faced towards the direction of motion, and at the rear thereof having sockets 55ᵈ. Upon the opposite side the arms 55ᵃ at the extremities thereof are the opposed dogs 55ᵉ, pivotally mounted thereon by the bolts 55ᶠ and the flanged thimbles 55ᵍ. The free ends of the dogs project inwardly, and are provided with teeth 55ʰ adapted to mesh with the teeth of the ratchet wheel 57ᵃ, and normally tending to mesh therewith by the force of the respective springs 55ᵏ, supported between the lug 55ⁱ of the arm 55 and the lug 55ʲ of the dog 55ᵉ.

Upon the free ends of the dogs 55ᵉ are eccentrically mounted, by the bolts 56ᵃ, laterally projecting pins 56, which pass beyond the arms 55ᵃ and are adapted to contact the cam-dog 50ᵍ formed upon the outer end of the bracket 50, as shown in full lines in Fig. 8. The portion 50ʲ of this cam, is concentric with the axis of the crank shaft 14, but about vertically below the said axis the portion 50ⁱ progressively departs from that surface and extends to the enlarged periphery 50ˡ, which is also concentric with the crank shaft 14. At the notch 50ʰ of the cam 50ᵍ the cam surface drops backwardly or inwardly to form a short portion 50ᵐ, radially below or within the short portion 50ʲ, for a reason explained later. Inasmuch as the pins 56 contact the cam during movement, subjecting them to wear, and it is desirable to keep the dogs at a substantially fixed distance from the teeth of the ratchet wheel when not in working position, the eccentric mounting of the pins provides a means for adjustment for correcting the wear.

Extending upwardly from the bracket 50 is a pair of spaced ears 50ᶜ and 50ᵈ pierced with opposed holes and having a spring cavity between the bridge portions 50ᵉ (see Figs. 3 and 5). Below the opposed holes on the ear 50ᶜ is another hole, and through the holes is passed a bent dog 58, having a long leg 58ᵃ and a short leg 58ᵇ. The latter passes only partially across the space between the ears 50ᶜ and 50ᵈ. Within the spring cavity a spring 58ᶜ surrounds the leg 58ᵃ of the dog to tension against the end of the cavity and a pin 58ᵉ in the dog, whereby the long end of the dog is kept normally outwardly and within the socket 55ᵈ at the outer end of the arm 55ᵃ. When the dog 58ᵃ is within the socket 55ᵈ the member 55 is locked from turning.

The outer face of the spring cavity is circumferentially concentric with the axis of the leg 58ᵃ, and pivoted thereon is a lever 52 by means of its base or opposed parts 51 and 52ᵃ. Formed upon the lower face of the parts 51—52ᵃ is a spiral lug 52ᵈ concentric with the axis of the leg 58ᵃ and in juxtaposition with the end of the short leg 58ᵇ of the dog 58, but permitting the end of the long leg 58ᵃ to penetrate the socket 55ᵈ when the latter is opposed to that end of the dog.

Beneath its pivot and at its lower end is pivoted a connecting rod 53, the forward end of which is pivoted at 54ᵃ to the upper end of the lever 54 and securely held there by of the cotter pin shown. The lower end of the lever 54 is pivoted between two ears 50ᶠ projecting forwardly from the lower portion of the bracket 50 and held therein by the bolt 54ᵇ. Formed in the lever is a spring box 54ᶜ, extending between which and a small lug on the bracket 50 (see Fig. 8) is a spring 54ᵉ, which normally holds the free end, connected by the rod 53, in forward position.

Extending laterally toward the cam 50ᵍ, and across the face 50ᵐ, is a curved arm on the lever 54, numbered 54ᵈ. The spring 54ᵉ normally forces the arm 54ᵈ to contact with the extremity of the pin 56. The force of the spring 54ᵉ is greater than the force of the spring 55ᵏ, whereby the dog 55ᵉ is kept from meshing with the teeth of the ratchet wheel 57ᵃ. The thickness of the arm 54ᵈ is equal to the depth of the depression of the surface 54ᵐ below or within the periphery of the surface 50ʲ, so that when the lever 54 is moved inwardly the outer surface of the cam 50ʲ and of the arm 54ᵈ will circumferentially coincide. When the lever 54 is in normal position the outer face of the part 54ᵈ will circumferentially coincide with the cam surface 50ˡ, so that the pin 56 can easily slide from the cam 50ˡ to and upon the cam 54ᵈ and still keep the dog 55ᵉ out of engagement with the teeth of the clutch wheel.

At the lower end of the lever 54 is a rearwardly projecting lug 54ᵍ, adapted to contact the forward surface of the bracket 50 and prevent the spring 54ᵉ from forcing the lever further than is desirable when in normal position.

Referring to Fig. 8, it will be seen that the leg 58ᵃ of the dog 58 is within the opening of the lug 55ᵈ, in which position the shifting mechanism is locked against movement, and that the crank portion of the crank shaft 14, shown in dotted lines, as when the plowing structure is in raised position, stands a little beyond the perpendicular. The active dog, 55ᵉ, engaged in shifting the plow, is disengaged and in the position shown in the lower position of Fig. 6. In Fig. 6 the crank shaft is shown in lowered position, the plows then being in the ground in lowered position, as indicated in Fig. 2, both the upper and lower dogs 55ᵉ being held out of clutch, the clutch wheel 57ᵃ being in continuous rotation when the plow travels forward. The long leg, 58ᵃ of the dog 58 is held, by the spring 58ᶜ, within the socket of 55ᵈ on the upper arm 55ᵃ, lever 52 is in upright position, while the lever 54 and the arm 54ᵈ are in their most forward position, the arm 54$^d$, which is in fact a movable section of the cam 50$^g$, holding the pin 56, and thereby the upper dog 55$^e$, out of engagement with the teeth of the clutch wheel, the opposite dog being held out of engagement by the extremity of the cam surface 50$^l$, as in Fig. 8.

When it is desired to raise the plows, the operator, who may be on the tractor engine that draws the plows, pulls the lever 52 forwardly by means of a cord 52$^e$, against the pressure of the spring 54$^c$, whereupon the cam 52$^d$ is rotated, and forces the leg 58$^b$ outwardly, and with it the leg 58$^a$ out of the socket 55$^d$, which releases the upper arm from the lock, leaving the whole arm free for rotation. Simultaneously with this release the lower end of the lever 52, by means of the rod 53, pulls the lever 54 inwardly and seats the arm 54$^d$ within the depression 50$^m$ of the cam 50$^g$, and the spring 55$^k$ will force the upper dog 55$^e$ into engagement with the teeth of the ratchet wheel 57$^a$, whereupon the ratchet will begin to turn the crank shaft 14, and through the link 25 and its connections and the link 28$^c$ and its connections, the shaft 22 and the brackets 23, raise the plow carrying structure, the brackets 19 and 20 sliding upwardly along the posts 17 and 18, the fore and aft walls of the brackets 19 and 20 being vertical to keep the supporting structure and the plow carrying structure longitudinally aligned.

Meanwhile, when the lever 52 is released, the spring 54$^c$ will force the lever 54 backwardly, bringing the outer surface of the cam part 54$^d$ approximately in line with the cam surface 50$^l$, and the lever 52 upright, the cam 52$^d$ returning to its original position out of the way of the leg 58$^b$ and the leg 58$^a$ will be forced to its original position by the spring 58$^c$, with its end in the path of the cam 55$^c$ on the ascending portion of the arm 55.

As the clutch wheel 57$^a$ moves the upper dog 55$^e$ forwardly, and downwardly, while the lug or arm 54$^d$ is within the depression 50$^m$, the pin 56 thereon slides downwardly over the arm and against the cam surface 50$^j$, while the opposite pin travels along the cam 50$^i$ and keeps the opposite dog to which it is attached from engagement with the ratchet wheel as the arm 55 rotates. As the forward pin 56 reaches the surface 50$^i$ the latter begins to draw its dog from engagement with the ratchet teeth, and completely does so as the crank shaft 14 reaches and has passed over the axial center, and about the time the pin of the opposite dog has reached the corner of the notch 50$^h$, and as the cam on the upper portion of the arm 55$^e$ has reached the leg 58$^a$ of the dog 58. Inasmuch as the crank shaft 14 has then passed somewhat over the center, the superimposed weight of the plow carrying structure will then cause the crank shaft to pass further over the center, the cam 55$^c$ will force the dog 58 backwardly, until the socket of the part 55$^d$ is opposite thereto, when the dog will be forced into the socket, and the parts will be again locked against further movement, the pin 56 of the then upper dog passing to the outer surface of the arm 54$^d$, as shown in Fig. 8. The further movement of the arm 55$^a$ caused by the weight of the plow carrying structure carries the opposite end (then the lower end) of the arm 55 further along, and with it the lower pin 56, to the conjunction of the cam surfaces 50$^i$ and 50$^l$, with the hook of the then lower dog 55$^e$ completely out of danger from engagement with the wheel ratchet.

As the front of the plow carrying structure is being raised, the arm 21$^e$ thereof turns the bell crank 36 as it rises to operate the connecting rod 37—38 to operate the rear shifting mechanism, whereby the rear end of the carrying structure is raised simultaneously with the raising of the front end, the movement of the forward end of the carrying structure being the direct means for shifting its rear end through the connections described. The presence of the dog 58 in the socket of the part 55$^d$ holds the whole structure, front and rear, in raised position. The spring 36$^a$ between the bell crank 36 and the plow carrying structure, assists in shifting the rod 37—38 and associated parts.

When it is desired to lower the plow carrying structure, the operator again pulls forwardly upon the cord 52$^e$, whereby the lock is again released, then the upper dog 55$^e$ will engage the teeth of the ratchet wheel and the parts will return to their original position with the plows in the ground; but it will be noticed that when the crank shaft 14 is down, it has passed by the center on the lower travel, and the force of the spring 33, being then at the extremity of its tension, will operate to carry the crank shaft somewhat further until the dog 58 is again in the upper socket of the then upper arm 55.

The depth of penetration is regulated by the hand lever 26, and independently of the power shifting mechanism the plow carrying structure may thereby be raised and lowered. The plow carrying structure may be leveled or tilted sidewise by the lever 28, there being sufficient freedom of parts to permit of the necessary movement for that purpose.

Many changes from the precise embodiment of my invention shown and described herein may be made, and still be within the scope of the invention.

Having now described my invention, what I claim is:

1. In a plow, the combination of carrying wheels, a plow carrying structure, a supporting structure comprising a crank shaft, a raising and lowering connection between the crank shaft and the plow carrying structure, power operated means for operating the crank shaft, means for releasing the operating means when the crank shaft has passed the dead center, a lock for the shaft, means for carrying the crank shaft from the releasing point to the locking position, and means for releasing the lock.

2. In a plow, the combination of carrying wheels, a plow carrying structure, a supporting structure comprising a crank shaft, a raising and lowering connection between the crank shaft and the plow carrying structure, the plow being raised when the crank shaft is above the dead center, power operated means for operating the crank shaft. means for releasing the power means when the crank shaft has passed the dead center, a lock for the crank shaft, the weight of the plow being adapted to move the crank shaft from the releasing point to locking position, and means for releasing the lock.

3. In a plow, the combination of a plow carrying structure with a supporting structure comprising carrying wheels and a crank shaft, a raising and lowering connection between the crank shaft and the plow carrying structure, the plow being lowered when the crank shaft is below the center, power operated means for rotating the crank shaft, a spring connection between the supporting structure and the plow carrying structure tensioned when the crank shaft is in its lowest position, means for releasing the power means when the crank shaft has passed the dead center, a lock for the crank shaft, the spring being adapted to move the crank shaft from the releasing point to the locking position, and means for releasing the lock.

4. In a plow, the combination of a plow carrying structure, with a supporting structure having carrying wheels, and means for raising and lowering the carrying structure comprising a crank, the plow carrying structure being raised when the crank is above the center and lowered when it is below it, power operated means for rotating the crank, comprising releasable gearing between the power means and the crank means for releasing the gearing when the crank has passed beyond the center when the plow is raised and when it is lowered, a spring connection between the two structures tensioned by the shift of the plow carrying structure while lowering, an automatic lock for the crank, the weight of the plow being adapted to move the crank from releasing position to locking position when the plow is raised, the spring being adapted to move the crank from releasing position to locking position when the plow is lowered, and manually operated means for releasing the lock.

5. In a plow, the combination of a plow carrying structure with a supporting structure, comprising a rotary member, releasable driving means for rotating the rotary member, a shifting connection between the rotatable member and the plow carrying structure, mechanism for releasing the driving means when the plow is in a shifted position, locking means circumferentially spaced from the releasing mechanism, the weight of the plow being used to carry the rotary member from the releasing point to the locking point, and means for releasing the lock.

6. In a plow, the combination of a plow carrying structure with a supporting structure, comprising a rotatable member, releasable driving means for rotating the member, a shifting connection between the rotatable member and the carrying structure, mechanism for releasing the driving member when the plow is in a shifted position, locking means circumferentially spaced from the releasing mechanism, mechanism for carrying the rotatable member from the releasing mechanism to the locking means, and means for releasing the lock.

WILLIAM W. CAMERON.